United States Patent [19]

Donegan

[11] Patent Number: 4,470,246

[45] Date of Patent: Sep. 11, 1984

[54] DROP-OFF BAGGER FOR POWER LAWN TOOL

[76] Inventor: James W. Donegan, 180 South New Rd., Hamden, Conn. 06518

[21] Appl. No.: 525,970

[22] Filed: Aug. 24, 1983

[51] Int. Cl.[3] .................... A01D 35/22; A01D 53/06
[52] U.S. Cl. ................................. 56/202; 56/320.1
[58] Field of Search ............... 56/202, 320.1, 5, 16.6; 141/10, 166

[56] References Cited

U.S. PATENT DOCUMENTS

| | | | |
|---|---|---|---|
| 3,890,772 | 6/1975 | Seifert et al. | 56/202 |
| 4,015,406 | 4/1977 | Witt et al. | 56/202 |
| 4,095,398 | 6/1978 | Aumann et al. | 56/202 |
| 4,186,546 | 2/1980 | Machado et al. | 56/202 |

Primary Examiner—Robert P. Swiatek
Assistant Examiner—John G. Weiss
Attorney, Agent, or Firm—Bachman and LaPointe

[57] ABSTRACT

A device for automatically bagging lawn clippings in disposable plastic bags comprises a frame having a bag compartment mounted thereon for automatically feeding the plastic bags to a bag clamping unit positioned in communication with the discharge conduit of the power lawn tool. A moveable discharge conduit unit is provided and is moveable between a first bag loading position and a second operating position wherein the discharge conduit communicate with the discharge of the power lawn tool for delivering the lawn clippings to the plastic lawn bag.

21 Claims, 10 Drawing Figures

DROP-OFF BAGGER FOR POWER LAWN TOOL

BACKGROUND OF THE INVENTION

The present invention is drawn to a device for automatically bagging lawn clippings, such as grass and leaves, into disposable plastic bags and, more particularly, a device for automatically bagging lawn clippings wherein the disposable plastic bags are automatically fed and positioned in place relative to the powered mower for receiving the lawn clippings.

The advantages of power lawn tools having a self-bagging facility for receiving lawn clippings have been generally recognized as evidenced by the fact that numerous self-bagging lawn mower attachment designs have been patented. Many of the prior art designs comprise a rigidly mounted bag holder having an opening around which a disposable plastic lawn bag is secured. The basic problem with many of these designs resides in the fact that there is no simple, effective, automatic mechanism for feeding and positioning the plastic lawn bags relative to the power mower. As a result of the foregoing, time is wasted in an effort to properly locate the bag and, when the bag is improperly located, lawn clippings fail to enter the bag interior. In addition, the requirement of manually locating the bag results in interruption of the mowing cycle thereby increasing mowing time. Naturally, it would be highly desirable to provide a lawn clipping bagging device for a power lawn tool which readily allows for the disposable plastic bags used to catch the clippings to be automatically fed and positioned in place with respect to the discharge chute of the mower. In addition, it would be highly desirable to provide a lawn bagging device as set forth above which is relatively inexpensive to manufacture, simple in construction and easy to install.

Accordingly, it is the principal object of the present invention to provide a device for automatically bagging lawn clippings.

It is a particular object of the present invention to provide a device for automatically bagging lawn clippings employing disposable plastic lawn bags.

It is a further object of the present invention to provide a device for automatically bagging lawn clippings wherein disposable plastic lawn bags are automatically fed and positioned in place relative to the discharge chute of the power lawn tool.

It is a still further object of the present invention to provide a device for automatically bagging lawn clippings which is relatively inexpensive to manufacture, simple in construction and easy to install.

It is a further object of the present invention to provide a bag having a self sealing facility which closes the bag opening so as to prevent discharge therefrom.

Further objects and advantages of the present invention will appear hereinbelow.

SUMMARY OF THE INVENTION

In accordance with the present invention, the foregoing objects and advantages are readily obtained.

The present invention relates to a device for automatically bagging lawn clippings into disposable plastic bags and, more particularly a device for automatically bagging lawn clippings wherein the disposable plastic bags are automatically fed and positioned in place relative to the exhaust conduit of the power lawn tool. In accordance with the present invention a frame carrying a plastic bag compartment is mounted on the rear of a lawn mower or other power lawn tool. A bag clamping unit is mounted on the frame below the plastic bag compartment for receiving and securing in place a plastic bag. A lever arrangement is provided for feeding the plastic bags from the bag compartment to the bag clamping unit. A discharge conduit is mounted on the mower for receiving clippings and the like and is selectively moveable between a first bag feeding position and a second operating position for delivering the clippings to the plastic lawn bags. In a preferred embodiment of the present invention, a barrel which receives the filled plastic bag is mounted on the handle bars of the mower. The barrel is pivotable to allow for easy unloading of the filled plastic bags. By way of the present invention, lawn clippings are bagged in disposable plastic bags which are easily and automatically fed and positioned in place relative to the exhaust conduit of a power lawn tool.

DETAILED DESCRIPTION

Figure 1:
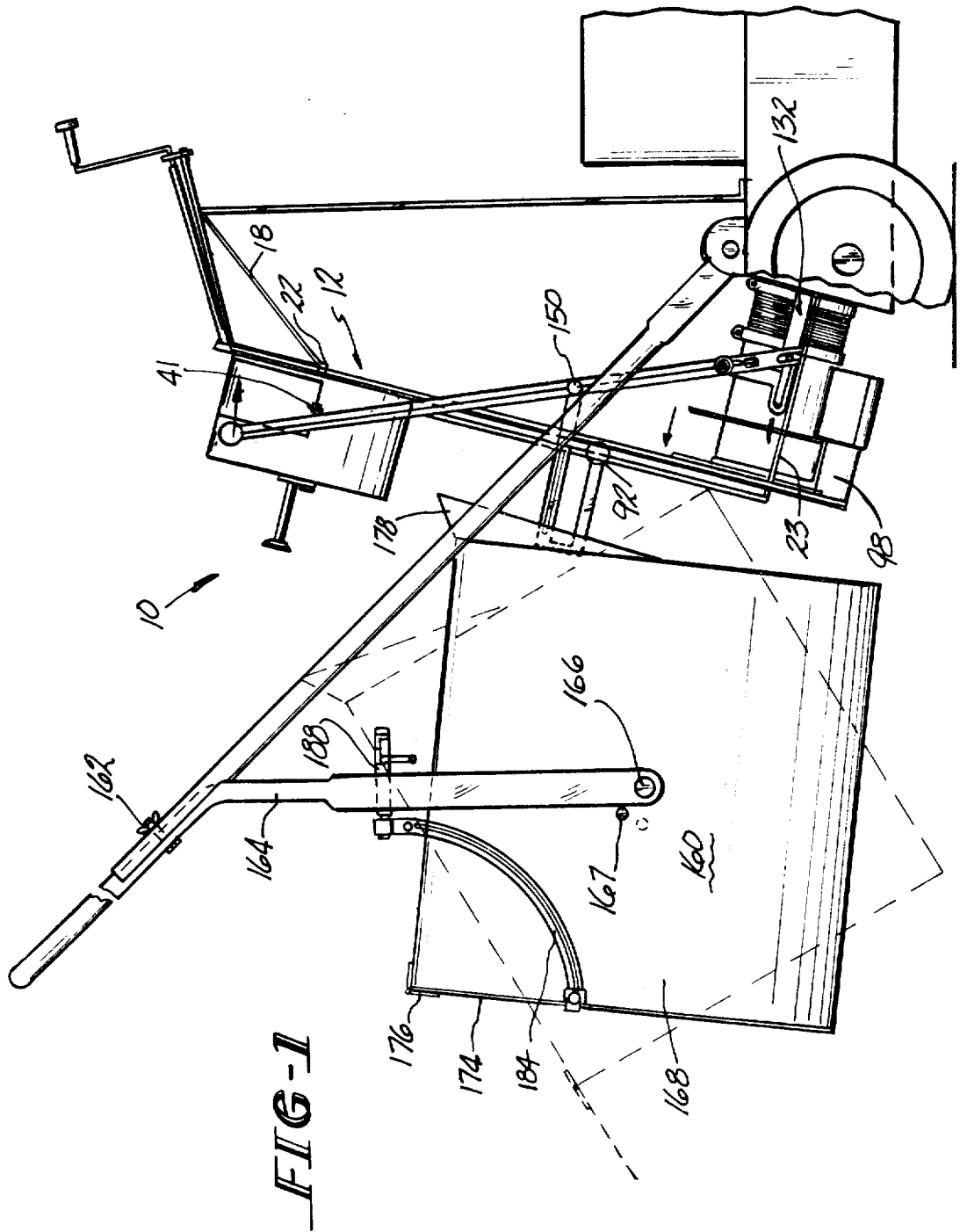
FIG. 1 is a schematic side view of the lawn bagging device in accordance with the present invention.

Referring to the drawings, a device 10 for automatically bagging lawn clippings comprises a frame 12 mounted on the rear of a lawn mower 14 by means of struts 16, 18, 20, 22 and 23. The frame 12 is in the form of a U and comprises two upstanding side leg portions 24 and 26 and a semi-circular connecting portion 28. As can best be seen in FIGS. 3, 4 and 5, mounted in frame 12 is a bag receiving compartment 29 which comprises a pair of end plates 30 and 32 and sidewalls (not shown) secured thereto by any suitable manner such as welding, gluing, bolts or the like so as to form a hollow channel 34 for receiving plastic bags in a manner to be discussed in detail hereinbelow. The sidewalls are provided with flange members 33 and 35 which are slidably received in side portions 24 and 26, respectively of frame 12 for reasons to be made clear hereinbelow. It should be noted, as is clear from the foregoing, the semicircular portion of compartment 29 is opened in the bottom.

Mounted on frame 12 and in communication with hollow channel 34 is a bag storage compartment 36 provided with a pivotable door 38 hinged at 39 and secured by clamp 41 for loading the compartment with bags. The interior 37 of compartment 36 receives a plate 40 having a rod 42 secured thereto which projects from the interior 37. A spring 39 is provided around the rod 42 for biasing plate 40 against the plastic bags 44 loaded in compartment 36. A pivotable latch 46 is provided on the exterior of compartment 36 for holding rod 42 and, therefore, plate 40 in its retracted position to allow for loading of the bags. In its retracted position the rod 42 is held in place by latch 46 which engages abutment member 48 provided on rod 42.

Figure 2:
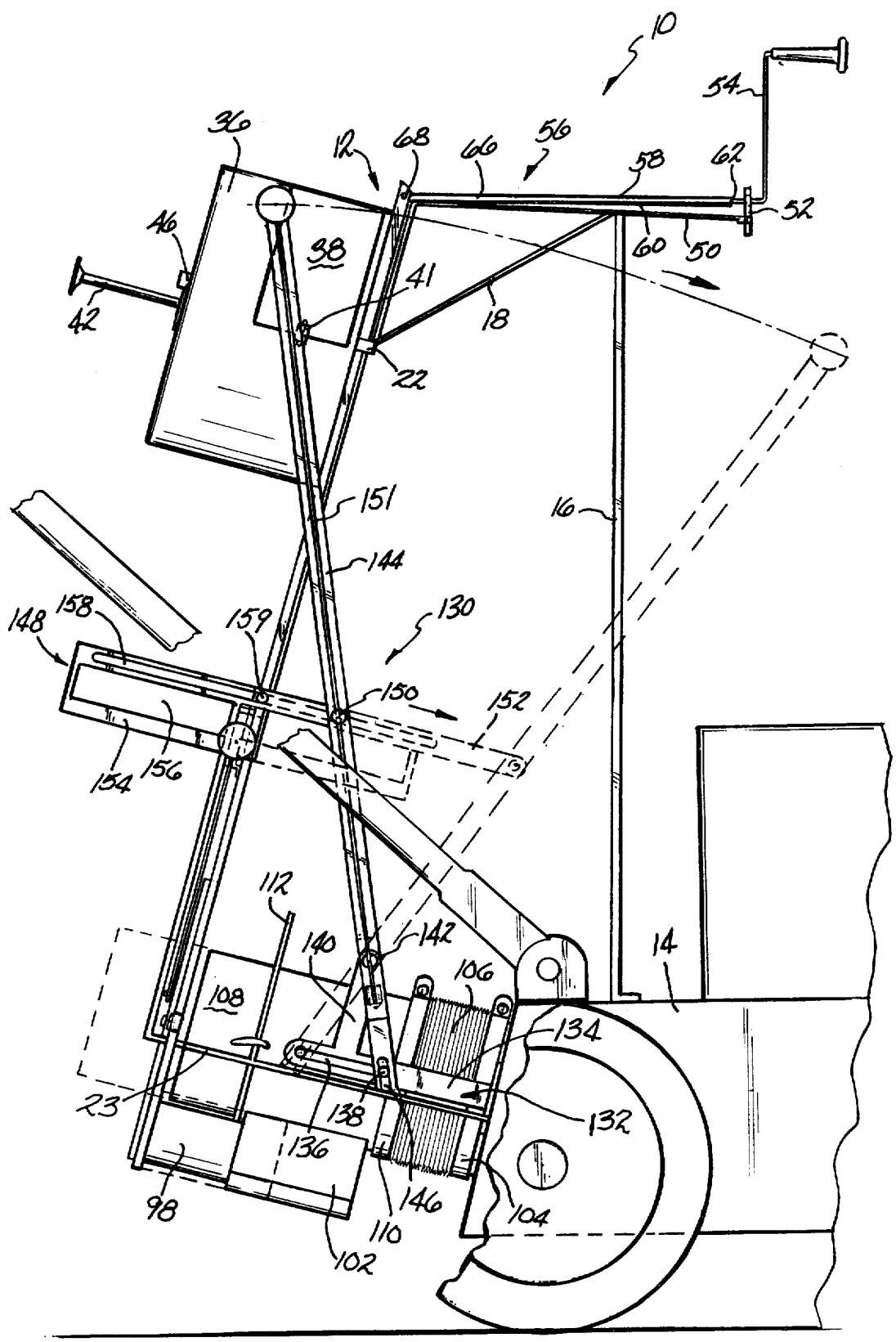
FIG. 2 is a partial side view of the lawn bagging device in accordance with the present invention illustrating the discharge conduit in its loading position and operating position.
Figure 4:
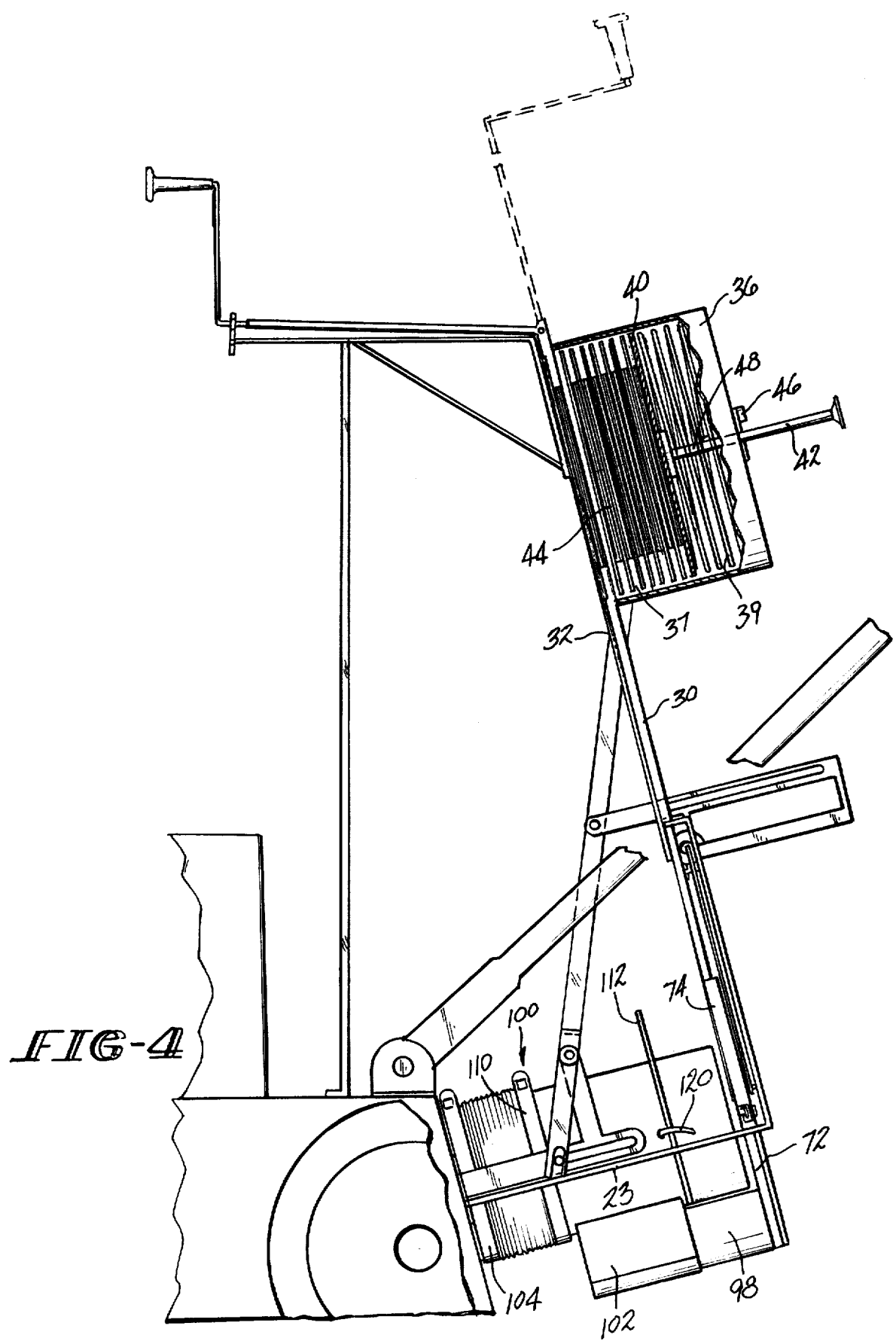
FIG. 4 is a partially sectioned side view of the lawn bagging device in accordance with the present invention illustrating the bag loading facility.
Figure 5:
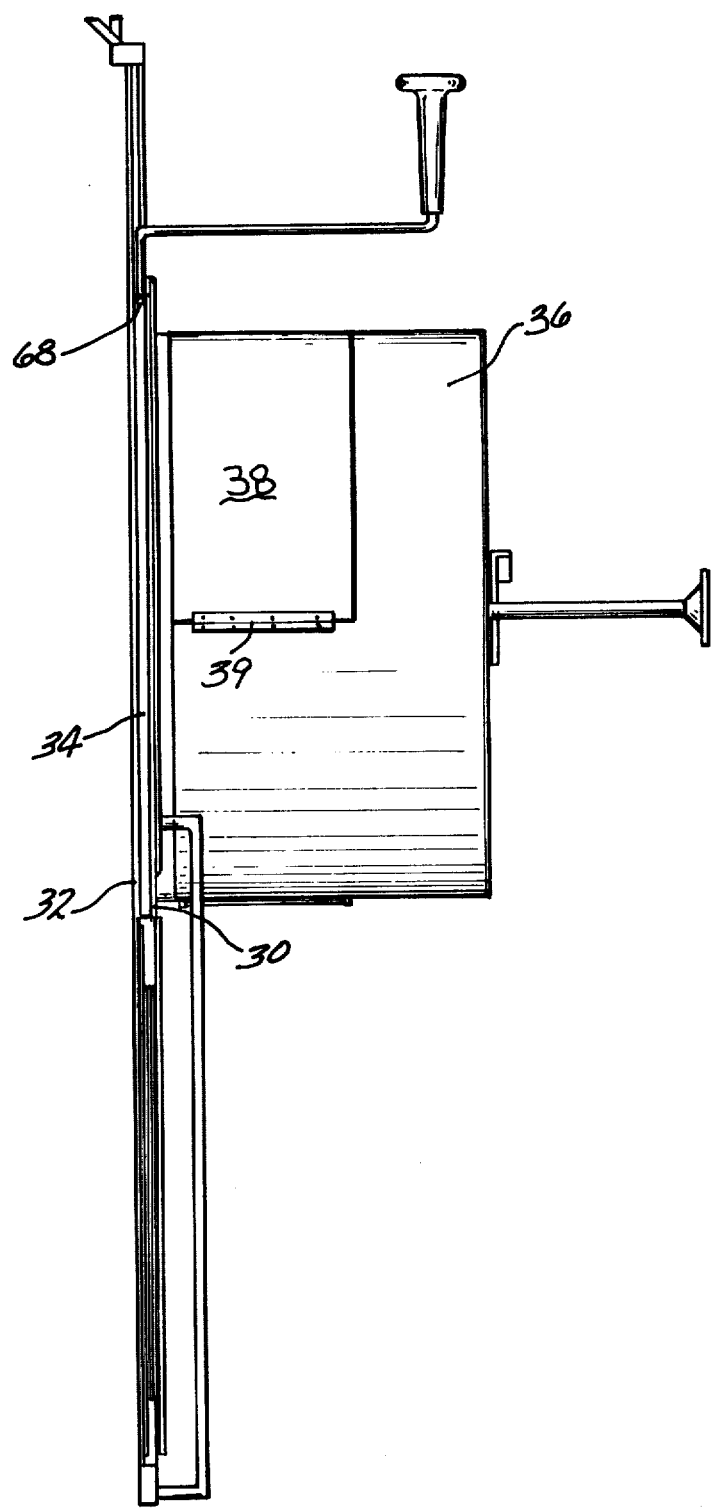
FIG. 5 is an enlarged partial view of the bag loading facility in accordance with the present invention.

With particular reference to FIGS. 2 and 4, strut 50 having a latch mechanism 52 extends from frame 12 and is secured to the ends of struts 16, 18 and 20 by any suitable means. Latch 52 is adapted to receive handle 54 which is secured to loading plate 56. Plate 56 comprises a substantially rectangular structure having a width substantially equal to the width of hollow channel 34. The loading plate 56 is formed of two substantially parallel sheets 58 and 60 which are joined by two end walls 62 so as to form a hollow opening 66. As can best be seen in FIG. 5, channel 34 receives a rod 68 which is secured to the sidewalls of receiving compartment 29. The rod 68 is received in opening 66 of loading plate 56 and acts as a guide for feeding loading plate 56 into channel 34.

Figure 3:
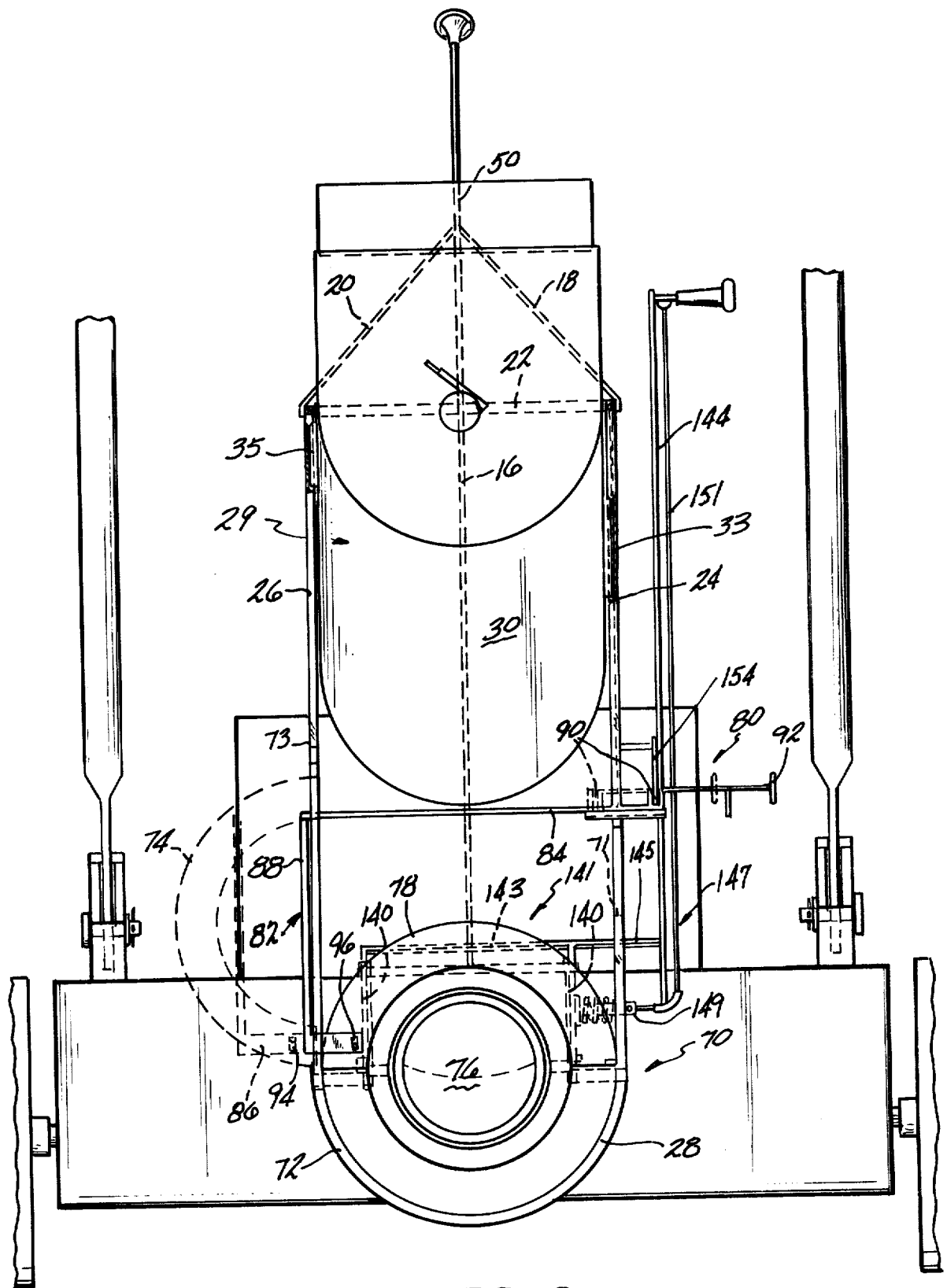
FIG. 3 is a rear view of the lawn bagging device in accordance with the present invention illustrating the operating positions of the bag clamping unit.
Figure 6:
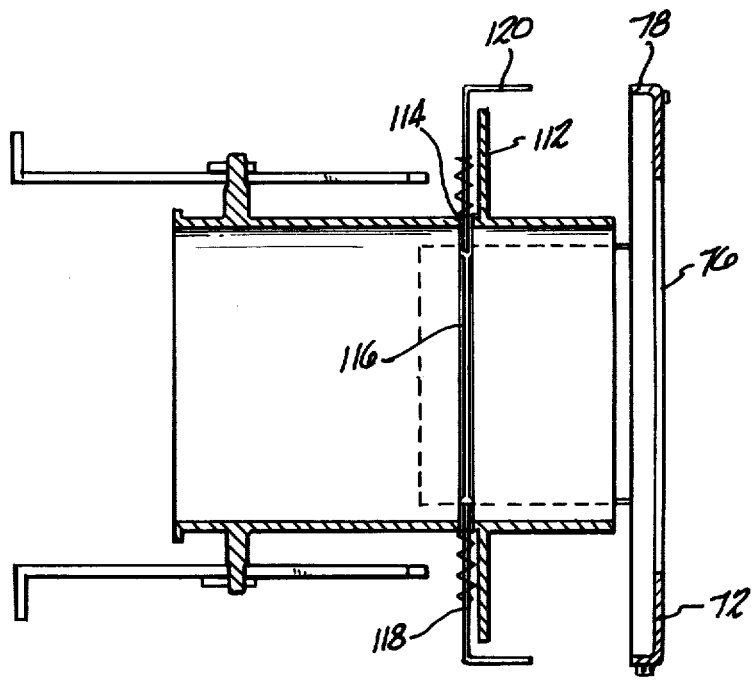
FIG. 6 is a sectional top view of the discharge conduit and bag clamping unit in accordance with the present invention illustrated in their first bag feeding position.

Referring now particularly to FIGS. 3, 4 and 6 a bag clamping unit 70 is mounted on connecting portion 28 of frame 12 and comprises a stationary lower half-moon portion 72 and a pivotable half-moon portion 74 which form with portion 72 a substantially doughnut shaped structure having a hollow opening 76. Half-moon portions 72 and 74 are provided with a peripheral flange 78 for reasons to be made clear hereinbelow. In order to pivot half-moon portion 74 a linkage system 80 (see FIG. 3) is provided and comprises a U-shaped portion 82 having a first long leg portion 84, a second short leg portion 86 and connecting portion 88. Long leg portion 84 has a U-shaped guide portion 90 on the end thereof and terminates in a handle portion 92. Short leg portion 86 is provided with a cut out 94 which receives in a secured manner a stud 96 which is secured to pivotable portion 74 of bag clamping unit 70.

Mounted on the bottom of frame 12 is a guide member 98 which is telescopically received in a corresponding guide member 102 provided on discharge conduit unit 100. Discharge conduit 100, which is secured to the outlet of the power mower by clamps 104, comprises a first flexible hose portion 106 and a second rigid portion 108 secured to each other by means of clamps 110. The outer peripheral surface of rigid portion 108 is provided with a continuous flange 112 which is adapted to mate with clamping unit 70 in a manner to be described in detail hereinbelow. Pivotably mounted in bores 114 provided in portion 108 is a circular valve plate 116. Rods 118 secured to valve plate 116 project out of bores 114 and are provided on the ends with cam member 120. Springs 122 are attached to rods 118 and portion 108 of discharge conduit unit 100 for automatically biasing valve plate 116 to its closed position as shown in FIG. 6.

In order to selectively position the discharge conduit unit 100 between its first bag feeding position and its second operating position a linkage system 130 is provided and comprises a pair of substantially L-shaped brackets 132 secured to the power mower on either side of discharge conduit 100. Long legs 134 of L-shaped brackets 132 on the side of portion 108 are provided with slots 136 which receive guide pins 138 mounted on portion 108 of conduit 100. Short legs 140 are connected by means of a cross bar 143 which form with legs 140 a U-shaped bracket assembly 141. Cross bar 143 has an extension portion 145 fixed to operating lever 144. Operating lever 144 and bracket assembly 141 pivot on pins 142 as seen in FIG. 3. The bottom end of operating lever 144 is provided with a slit 146 which receives guide pin 138 in a permanent manner. A spring-loaded locking mechanism 147 comprising a pin 149 and cable mechanism 151 is used for securing operating lever 144 in place. The locking mechanism 147 is operated by rotating handle 153 of operating lever 144.

As can best be seen in FIG. 2, half way up operating lever 144 is secured in a pivotable manner a stop linkage 148 by means of pin 150. Stop linkage 148 comprises arm portion 152 having secured thereto a U-shaped portion 154 which defines with arm portion 152 a space 156. In addition, arm portion 152 is provided with an elongated slot 158 which receives a guide pin 159 for guiding the movement of U-shaped portion 154 of stop linkage 148 in guide portion 90 of linkage system 80 for bag clamping unit 70 (see FIG. 3).

Figure 10:
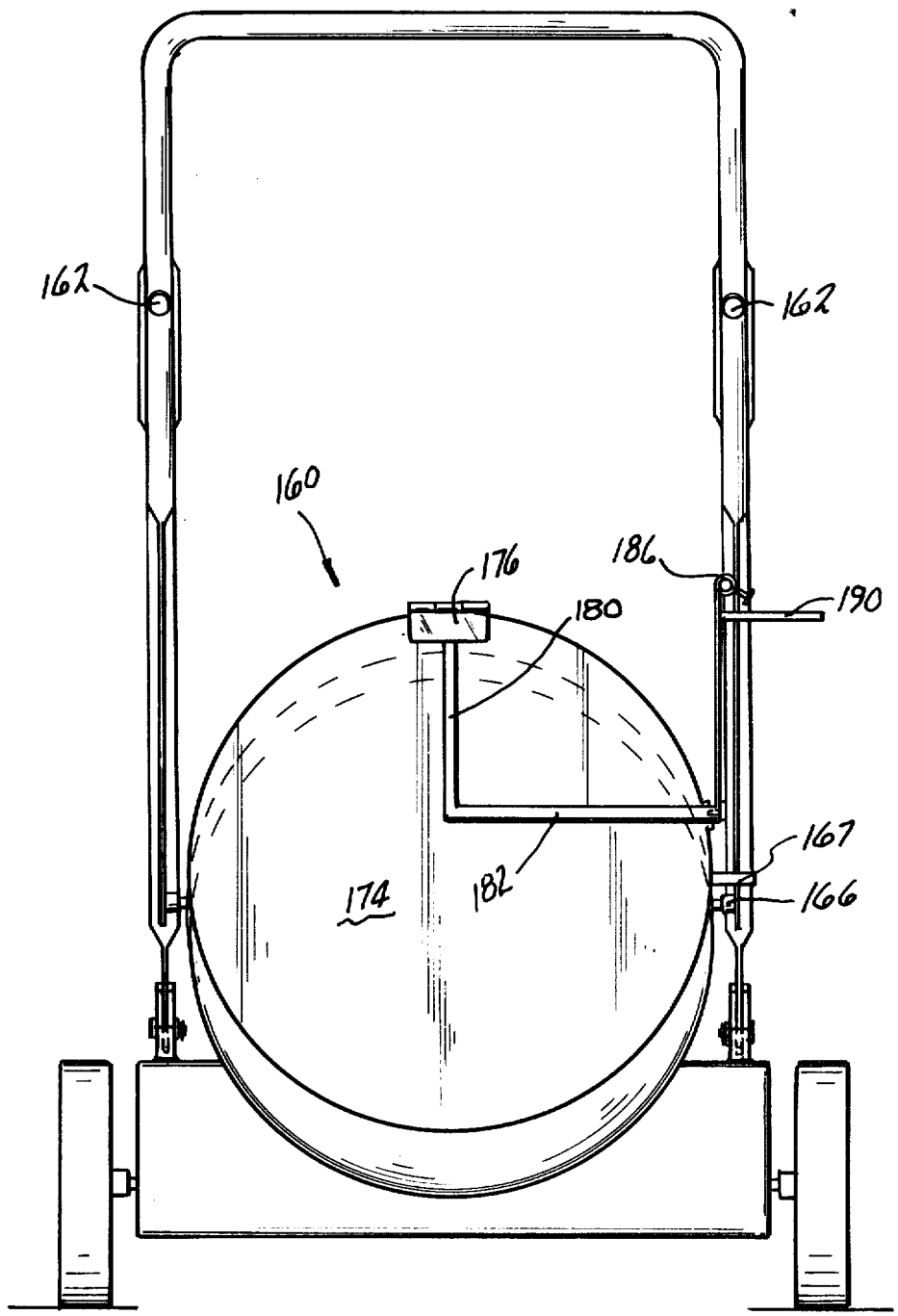
FIG. 10 is a rear view of the dumping barrel used with the device of the present invention.

Referring now specifically to FIGS. 1 and 10, a dumping barrel 160 is secured to the handle bars of the power mower by means of bolts 162 which secure angled brackets 164 to the handle bars. The lower end of brackets 164 are provided with bearing rods 166 which are pivotably received in the sidewall 168 of the barrel 160. The barrel 160 comprises a cylindrical sidewall 168 having a stop 167 mounted thereon and a pivotably mounted back wall 174 which pivots by means of hinge 176. The front of barrel 160 is open and is provided with a protective shield 178. Secured to hinge 176 and back wall 174 is an L-shaped bracket 180. The long leg 182 of L-shaped bracket 180 is secured in turn to curved member 184. Curved member 184 has an eye portion 186 adapted to receive slide bolt 188 for holding the barrel 160 in the position shown in solid lines in FIG. 1. A push bar 190 is secured to curved member 184 for tilting the barrel 160 on bearing rods 166 to the position shown in phantom lines in FIG. 1 for opening back wall 174 and discharging a filled bag.

Figure 9:
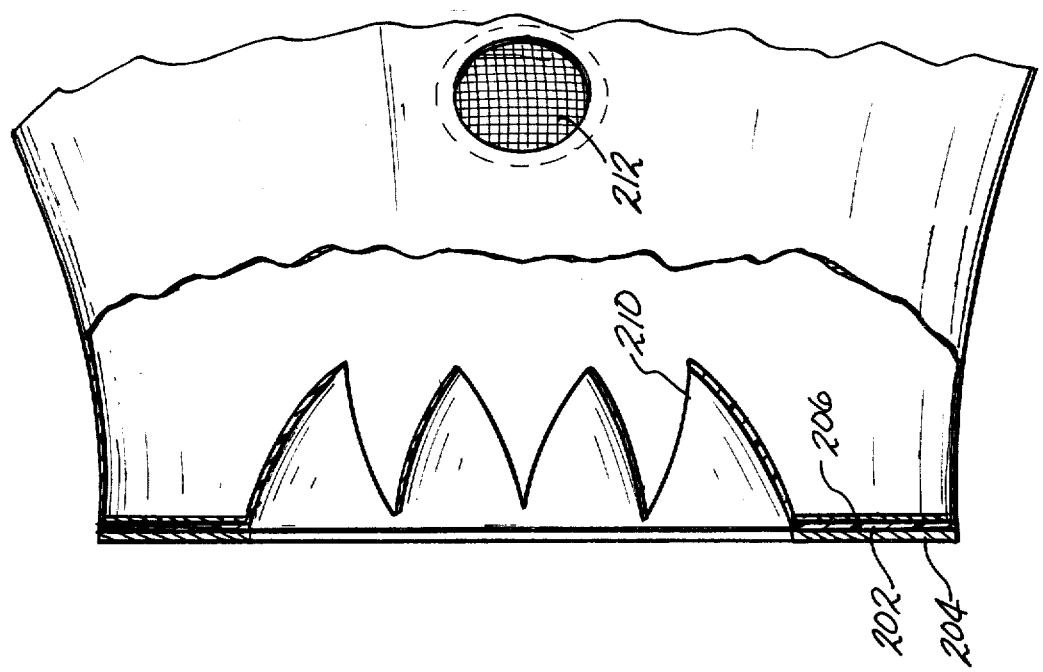
FIG. 9 is a sectional side view of the bag head used on the plastic bags employed in the lawn bagging device in accordance with the present invention.
Figure 8:
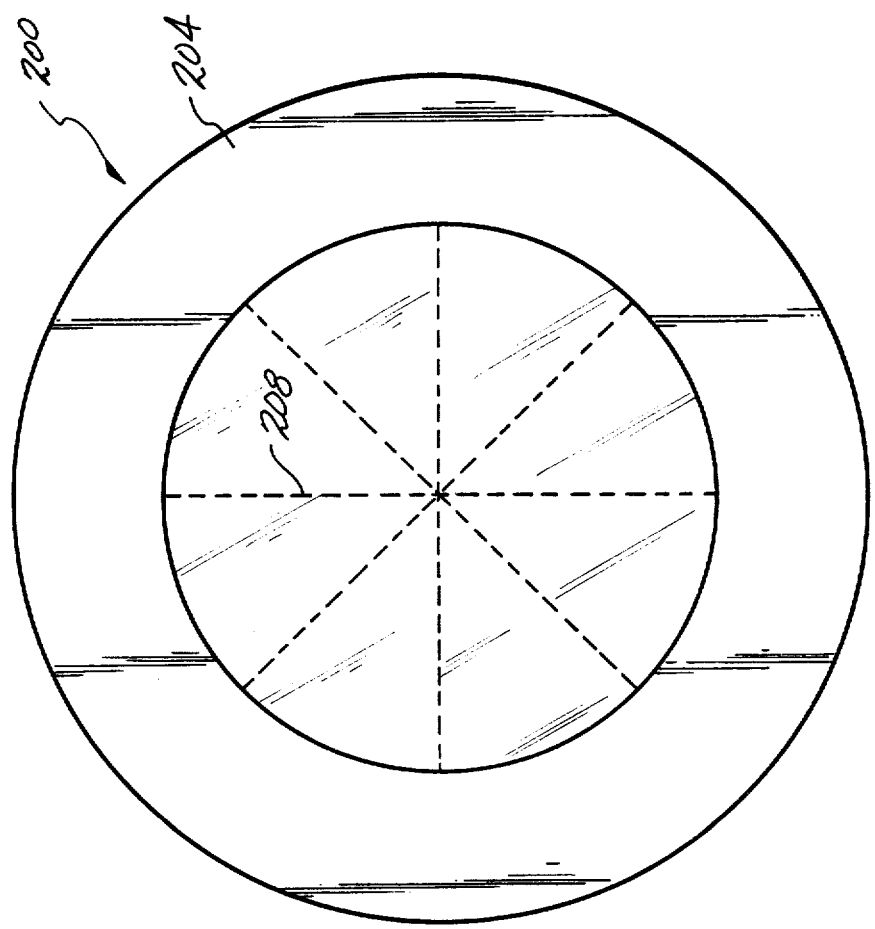
FIG. 8 is a front view of a bag head used on the plastic bags employed in the lawn bagging device of the present invention.

Referring now to FIGS. 8 and 9, there is illustrated a specific bag head design 200 which is used in combination with the device of the present invention. The portion of the plastic bag 202 which defines the bag opening is clamped between two discs 204 and 206 by means of glue or the like. Disc 204 is in the shape of a flat washer while disc 206 has a plurality of wedge-shaped tear lines 208 which, when cut, form wedges 210 which act as a seal to close the plastic bag when full with lawn clippings as will be discussed hereinbelow.

The operation of the device of the present invention will now be discussed in detail. Assuming that the bag storage compartment 36 is empty, the operator in order to fill compartment 36 would pull back rod 42 and plate 40 against the bias of spring 39. Pivotable latch 46 may then be positioned so as to abut member 48 on the rod 42 so as to hold the plate 40 and rod 42 in their retracting position. The operator then opens pivotable door 38. The compartment can then be loaded with the appropriate plastic bags 44 as described above with regard to FIG. 8. The pivotable door 38 is then closed and the latch 46 is pivoted so as to release rod 42 and allow the plate 40 to bias against the plastic bags 44. With the bags 44 in place within the compartment 36 the mechanism is now set for loading the bags automatically into bag clamping unit 70.

With the bags loaded as set forth above the operator, prior to displacing the bags with the loading plate 56, opens the bag clamping unit 70 by positioning handle 92 connected to the linkage system 80 for pivoting the half-moon portion 74 to its open position as shown in phantom in FIG. 3. Note that in order to bias the handle 92 to the left as shown in phantom lines in FIG. 3, it is necessary that the linkage system 130 for positioning the discharge conduit unit 100 be in the position as shown in solid lines in FIG. 2. If the linkage system 130 is in the position shown in phantom lines in FIG. 2, the stop linkage 148 and in particular U-shaped portion 154 would be resting in guide portion 90 of the linkage system 80 thereby prohibiting movement of the linkage system 80 to the left.

Figure 7:
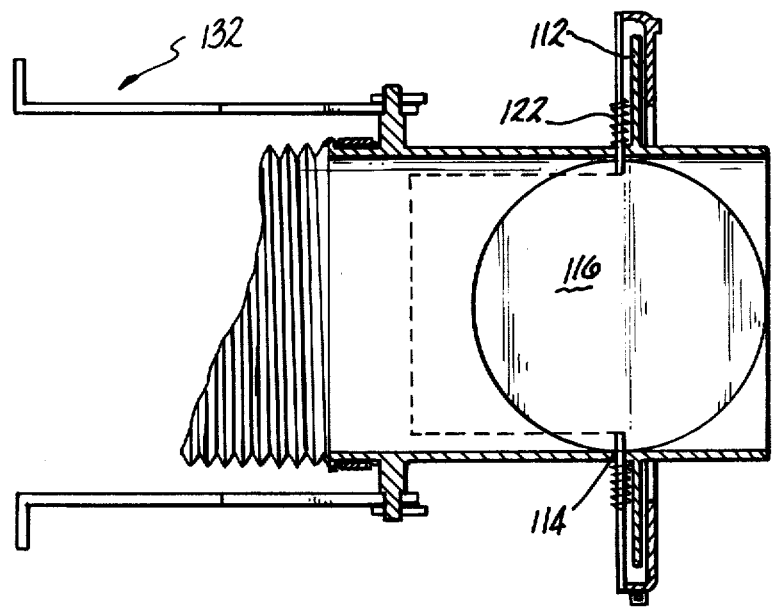
FIG. 7 is a sectional top view of the discharge conduit and bag clamping unit in accordance with the present invention illustrated in their operating positions.

With the biasing plate 40 now biasing one of the plastic bags 44 into hollow channel 34 of the compartment 29 and with the half-moon portion 74 in its open position, the operator unlatches loading plate 56 from latch mechanism 52 provided on strut 50. By positioning the loading plate in line with hollow channel 34 as shown in phantom in FIG. 4, compartment 29 is allowed to slide downward in frame 12 by means of guides 33 and 35 until the guides abut stops 71 and 73 provided in the channels of side leg portions 24 and 26 such that the compartment 29 assumes the position shown in phantom in FIG. 3 where compartment 29 penetrates the space defined by bag clamping unit 70. The operator then pushes the loading plate 56 over rod 68 into hollow channel 34 so as to position the plastic bag down through hollow channel 34 and into the opened bag clamping unit 70. The head assembly 200 of the plastic bag rests in the lower half-moon portion 72 of the clamping unit 70 wherein the wedge-shaped tear lines 208 on disc 206 match up with the hollow opening 76 of the half-moon shaped portions. The loading plate 56 is then retracted along with compartment 29 by means of plate 56 contacting rod 68. The loading plate 56 is secured in place in latch mechanism 52. The pivotable half-moon portion 74 is then moved to its closed position by returning handle 92 to the right as shown in solid lines in FIG. 3. With the bag now held in the bag clamping unit 70, the operator moves the discharge conduit unit from its bag feeding position, as shown in solid lines in FIG. 2, to its operating position, as shown in FIG. 7. In order to move the discharge conduit unit to its operating position the operator, employing linkage system 130, shifts operating lever 144 to the position shown in phantom lines in FIG. 2. Movement of the operating lever 144 which pivots about pin 142 secured to the L-shaped bracket 132 moves the stop linkage 148 to the right so that the linkage 148 and in particular the U-shaped portion 142 rests in guide portion 90 of linkage system 80 so as to prohibit movement of the linkage system 80 as previously discussed above. At the same time, movement of the operating lever 144 moves the discharge conduit unit 100 to the left as shown in FIG. 2 by expanding the flexible hose 106 such that the continuous flange 112 on the outer surface of the rigid portion 108 of the discharge conduit 100 is received within the peripheral surface of the flange portion 78 of the bag clamping unit 70 for holding the bag head securely in place therein. As can best be seen in FIGS. 6 and 7, movement of the discharge conduit unit to its operating position results in the cams 120 on the rods 118, which are rotatably mounted in portion 114, to bear against the flange 78 thereby rotating the rods 118 and correspondingly the valve plate 116 to its open position as shown in FIG. 7. At the same time, the portion of the rigid portion 108 upstream of the flange 112 would be telescopically received within the bag head 200 and cuts the wedge-shaped tear lines 208 so as to bias them to their open position thereby communicating the exhaust from the lawn mower to the interior of the discharge conduit 100. The plastic bag is now properly in place and operational. During the operation of the lawn mower the exhaust stream flows through the interior of the discharge conduit unit 100 and the force of the air pushes the bag open and into the dumping barrel 160. In accordance with the present invention a vent 212 should be provided in the plastic bag so as to allow for the exhaust of excess air from the interior of the bag to atmosphere so as to avoid undue pressure build up within the plastic bag. When the plastic bag is filled with lawn clippings the discharge conduit unit via linkage system 130 is moved to its bag feeding position as shown in FIG. 6 wherein the wedge-shaped cuts 208 now provided on the bag head 200 effectively close and seal the bag. The filled bag may then be discharged from the barrel 106 by first opening the bag clamping device, unlocking and tipping the barrel so as to open back wall 174 and allow the bag to be displaced therefrom. The barrel can now be returned to its normal position and locked in place. The bag clamping device is then filled with a new plastic bag in the manner described above.

As can be seen from the foregoing, the device of the present invention allows for the automatic bagging of lawn clippings into disposable plastic bags which are automatically fed and positioned in place relative to the exhaust conduit of the power lawn tool in an efficient and effective manner.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. In a lawn tool having a housing wherein lawn clippings are discharged in a stream of air from the housing through an outlet provided in the housing, an accessory for catching and bagging said lawn clippings comprising a frame mounted on said lawn tool, said frame having a hollow channel for receiving plastic lawn bags, a bag storage compartment mounted on said frame and communicating with said hollow channel for feeding plastic bags to said hollow channel, a bag clamping unit mounted on said frame below said bag storage compartment and in communication with said hollow channel for receiving plastic bags from said hollow channel and a discharge conduit unit secured to the housing outlet for receiving the discharged lawn clippings, said discharge conduit unit being selectively movable between a first bag feeding position wherein a plastic bag is fed from said hollow channel to said bag clamping unit and a second operating position wherein said discharge conduit unit is telescopically received in said bag clamping unit.

2. The apparatus of claim 1 wherein said frame is provided with a guide member below said bag clamping unit, said guide member being telescopically received in a corresponding guide member provided on the bottom of said discharge conduit unit.

3. The apparatus of claim 1 wherein said discharge conduit unit comprises a first flexible hose portion connected to the housing outlet and a second rigid portion downstream of said first flexible hose portion.

4. The apparatus of claim 3 wherein said frame is provided with a guide member below said bag clamping unit, said guide member being telescopically received in a corresponding guide member provided on said second rigid portion of said discharge conduit unit.

5. The apparatus of claim 3 wherein the outer peripheral surface of said second rigid portion of said discharge conduit unit is provided with a continuous flange which is adapted to mate with said bag clamping unit when said discharge conduit unit is in its second operating position.

6. The apparatus of claim 1 wherein said discharge conduit unit is provided with a pivotably mounted valve plate for selectively blocking the flow of air from the housing through said discharge conduit unit.

7. The apparatus of claim 6 wherein said valve plate blocks the flow of air when said discharge conduit unit is in its first position.

8. The apparatus of claim 6 wherein said valve plate allows the flow of air when said discharge conduit unit is in its second position.

9. The apparatus of claim 6 wherein said valve plate is a circular valve plate and is provided with a pair of rods which are pivotably mounted in bores provided in said discharge conduit unit.

10. The apparatus of claim 9 wherein said valve plate is spring loaded to its closed position.

11. The apparatus of claim 10 wherein said rods are provided with cams for pivoting said valve plate when said discharge conduit unit is in its second operating position.

12. The apparatus of claim 3 wherein a lever is associated with said discharge conduit means for selectively positioning said discharge conduit means in its first bag feeding position and its second operating position.

13. The apparatus of claim 1 wherein a loading plate is positioned within said hollow channel in said frame and is selectively movable within said hollow chamber for feeding a plastic bag to said bag clamping unit.

14. The apparatus of claim 1 wherein said bag clamping unit comprises a stationary lower half-moon portion and a pivotable upper half-moon portion which forms with said stationary portion a substantially doughnut-shaped structure.

15. The apparatus of claim 14 wherein said pivotable half-moon portion is secured to a linkage system for moving said pivotable half-moon portion between an opened bag feeding position and a closed bag clamping position.

16. The apparatus of claim 1 wherein said frame is in the form of a U and comprises two upstanding side leg portions, a semi-circular connecting portion and a pair of end plates secured to the upstanding side leg portions so as to form said hollow channel.

17. The apparatus of claim 16 wherein said bag storage compartment is mounted on one of said end plates and includes a spring loaded biasing plate for biasing the plastic bags into said hollow channel.

18. The apparatus of claim 1 wherein said lawn power tool includes a pair of handle bars secured to said housing, said handle bars being provided with means for receiving a pair of angled brackets wherein said angled brackets receive in a pivotable manner a barrel.

19. The apparatus of claim 18 wherein one of said pair of angled brackets is provided with bolt means for securing said barrel in place.

20. The apparatus of claim 19 wherein said barrel has secured thereto a curved member having an eye portion adapted to receive the bolt secured to said one of said pair of angled brackets.

21. The apparatus of claim 18 wherein said barrel is provided with a hinged back wall which opens when said barrel is pivoted.

* * * * *